(12) United States Patent
Gentsch et al.

(10) Patent No.: US 10,886,642 B2
(45) Date of Patent: Jan. 5, 2021

(54) MECHANICAL AND ELECTRICAL CONNECTION ELEMENT FOR THE USE IN LOW, MEDIUM AND HIGH VOLTAGE

(71) Applicant: ABB Schweiz AG, Baden (CH)

(72) Inventors: Dietmar Gentsch, Ratingen (DE); Christian Reuber, Willich (DE)

(73) Assignee: ABB SCHWEIZ AG, Baden (CH)

( * ) Notice: Subject to any disclaimer, the term of this patent is extended or adjusted under 35 U.S.C. 154(b) by 0 days.

(21) Appl. No.: 16/747,005

(22) Filed: Jan. 20, 2020

(65) Prior Publication Data

US 2020/0153126 A1 May 14, 2020

Related U.S. Application Data

(63) Continuation of application No. PCT/EP2018/069550, filed on Jul. 18, 2018.

(30) Foreign Application Priority Data

Jul. 21, 2017 (EP) .................................... 17182665

(51) Int. Cl.
  *H01R 13/405* (2006.01)
  *H01R 4/56* (2006.01)
  *H01H 33/66* (2006.01)
  *H02B 11/02* (2006.01)

(52) U.S. Cl.
  CPC ........... *H01R 4/56* (2013.01); *H01H 33/6606* (2013.01); *H02B 11/02* (2013.01)

(58) Field of Classification Search
  CPC ....... H01R 4/56; H01H 33/6606; H02B 11/02
  USPC ..................... 439/733.1, 736, 737
  See application file for complete search history.

(56) References Cited

U.S. PATENT DOCUMENTS

| 10,014,597 | B2 * | 7/2018 | Gentsch | ............. H01R 13/6215 |
| 2017/0271786 | A1 * | 9/2017 | Gentsch | ................... H01R 4/56 |

FOREIGN PATENT DOCUMENTS

| DE | 112753 C | 8/1900 |
| DE | 8019782 U1 | 12/1980 |
| EP | 3029777 A1 | 6/2016 |

* cited by examiner

*Primary Examiner* — Khiem M Nguyen
(74) *Attorney, Agent, or Firm* — Leydig, Voit & Mayer, Ltd.

(57) ABSTRACT

An electrical connection for medium and high voltage switchgears includes an electrical terminal of a switchgear. An electrical contacting surface of the electrical terminal as first current carrying part is electrically connected with a contacting surface of an external electrical connector part as second current carrying part via a connecting system. The connecting system includes a stretch-bolt function, which is integrated in one of the current carrying parts. The stretch bolt function is provided with a male screw thread at the extending end, which is configured to be screwed into a female threaded hole of the second current carrying part.

12 Claims, 2 Drawing Sheets

* MECHANICAL AND ELECTRICAL CONNECTION ELEMENT FOR THE USE IN LOW, MEDIUM AND HIGH VOLTAGE

CROSS-REFERENCE TO PRIOR APPLICATIONS

This application is a continuation of International Patent Application No. PCT/EP2018/069550, filed on Jul. 18, 2018, which claims priority to European Patent Application No. EP 17 182 665.4, filed on Jul. 21, 2017. The entire disclosure of both applications is hereby incorporated by reference herein.

FIELD

The invention relates to a mechanical and electrical connection element for the use in low, medium and high voltage, for circuit breakers, reclosers and switchgears.

BACKGROUND

Electrical connections of current carrying parts need a certain force onto the contact surfaces, in order to realize a safe mechanical contact, as well as an optimal electrical contact with minimum transition resistance, and this force needs to be reliable over time regardless e.g. of mechanical vibrations and temperature cycles. Known ways of realization of electrical connections of this kind are e.g. connections with screws, nuts and spring washers.

A design to realize an electrical and mechanical contact is disclosed by the application of a stretched bolt between both contacting parts, as known from the EP 3 029 777 A1. But in this construction, both sides of the stretch-bolt end in a terminal part at one side, and in a connector part at the other side.

SUMMARY

In an embodiment, the present invention provides an electrical connection for medium and high voltage switchgears including an electrical terminal of a switchgear. An electrical contacting surface of the electrical terminal as first current carrying part is electrically connected with a contacting surface of an external electrical connector part as second current carrying part via a connecting system. The connecting system includes a stretch-bolt function, which is integrated in one of the current carrying parts. The stretch bolt function is provided with a male screw thread at the extending end, which is configured to be screwed into a female threaded hole of the second current carrying part.

BRIEF DESCRIPTION OF THE DRAWINGS

Embodiments of the present invention will be described in even greater detail below based on the exemplary figures. The present invention is not limited to the exemplary embodiments. All features described and/or illustrated herein can be used alone or combined in different combinations in embodiments of the present invention. The features and advantages of various embodiments of the present invention will become apparent by reading the following detailed description with reference to the attached drawings which illustrate the following.

DETAILED DESCRIPTION

Figure 1:
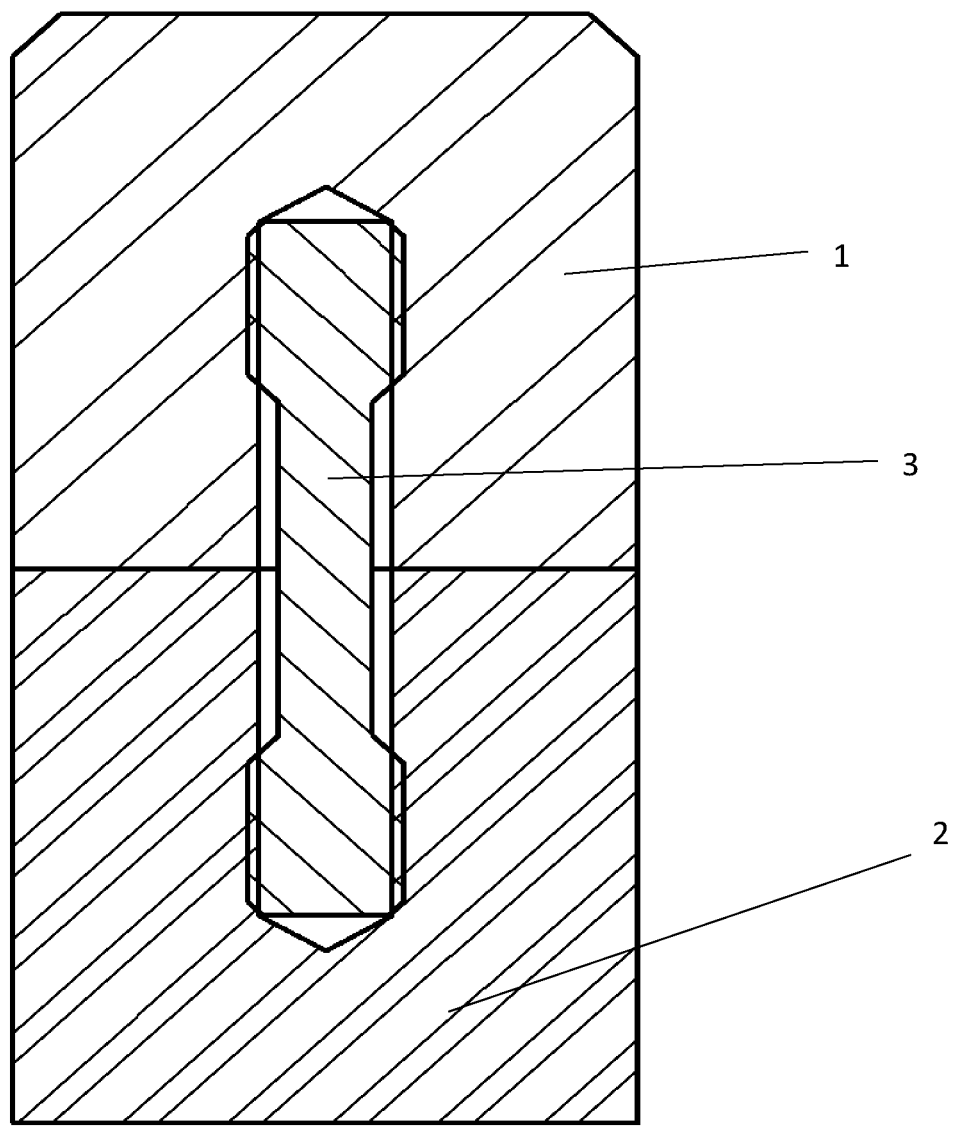
FIG. 1 shows a first current carrying part, a second current carrying part, and a stretch bolt.

A disadvantage of using a screw and a spring washer is, that the end of the screw extends to the outside of the assembly. This can result in electrical problems due to the relatively sharp edges of the head of the screw. Further, especially for outdoor applications, it is disadvantageous to have many parts, transitions between parts and uneven surfaces with edges, where pollution and humidity can adhere, because of increased corrosion. This can reduce the dielectric and/or the conductivity performance of the switchgear and can also initiate thermal losses at transition restistances.

As stated above, a design to realize an electrical and mechanical contact is disclosed by the application of a stretched bolt between both contacting parts, as known from the EP 3 029 777 A1. See FIG. 1. But in this construction, both sides of the stretch-bolt end in a terminal part at one side, and in a connector part at the other side.

The aforesaid design requires a certain length for two threaded connections. In an embodiment, the invention overcomes the aforesaid disadvantage.

In an embodiment, the connecting system comprises a stretch-bolt function, which is integrated in one of the current carrying parts, and that the stretch bolt feature is provided with a male screw thread at the extending end, which can be screwed into a female threaded hole of the other current carrying part.

By an embodiment of the invention it is possible to integrate the stretched bolt function into one of the current carrying parts. So, the totally required length is shorter. This can also result in a reduced mass. Furthermore, the number of parts is reduced.

In an embodiment, integration means that the bolt function is either realized as a feature of one current carrying part, i.e. the bolt is not assembled or linked to the current carrying part, but e.g. machined together with the current carrying part from the same raw part, or realized by a permanent joint of the stretched bolt with the current carrying part e.g. by soldering, hard soldering, welding friction welding, heat shrinking or alike.

In a further advantageous embodiment, the in the concerning current carrying part integrated end of the stretch-bolt is integrally bonded to the aforesaid current carrying part at the bottom of a stud hole, and that the inner diameter of that stud hole is bigger than the outer diameter of the stretch bolt.

The material for the integrated stretch bolt can be chosen according to the needs of current carrying capability and to the needs of the mechanical strength of the threaded connection.

Current carrying parts are usually made of copper or aluminium. Screws and threaded bolts are also regularly being made of these materials. It will have to be considered that the specific mechanical strength of these bolts will be lower compared e.g. to threaded bolts made of steel, but this can be compensated by increasing the diameter of the integrated stretch bolt.

In a further advantageous embodiment, the stretch bolt as well as at least one of the current carrying parts is made of aluminum or copper.

The electrical conductivity of aluminium and copper can slightly be reduced, when the materials are adjusted for high mechanical strength. This can be considered in the overall design of the low, medium or high voltage equipment.

Especially for outdoor applications, the current carrying parts usually have quite some margin regarding current carrying capability, so that it would not be required to increase e.g. the diameter of the current carrying parts.

In a further advantageous embodiment the second current carrying part is partly embedded into insulation material.

Another embodiment is, that the first current carrying part is a terminal, of a vacuum interrupter, which is embedded into said insulation material.

FIG. 1 shows a first current carrying part 1, a second current carrying part 2 and a stretch bolt 3. See EP 3 029 777.

Figure 2:
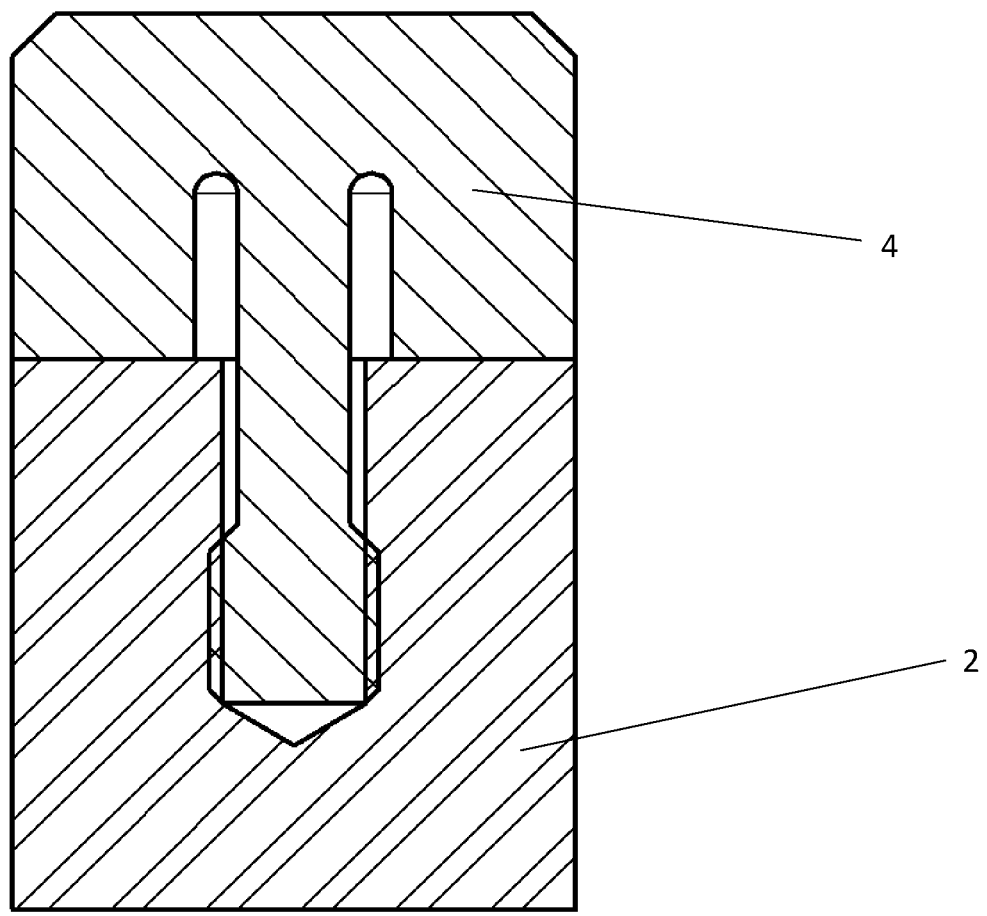
FIG. 2 shows a first current carrying part with an integrated stretch bolt, and a second current carrying part. During assembly, the first current carrying part is rotated against the second current carrying part like a screw until the integrated bolt is sufficiently stretched.

FIG. 2 shows a first current carrying part 4 with an integrated stretch bolt, and a second current carrying part 2. During assembly, part 4 is rotated against part 2 like a screw until the integrated bolt is sufficiently stretched.

An advantageous embodiment of this invention is the application to a pole part, where the second current carrying part 4 is a terminal of said pole part, that is partly embedded into insulation material. The first current carrying part 1 can then be a terminal of a vacuum interrupter embedded into said insulation material.

While embodiments of the invention have been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. An electrical connection for medium and high voltage switchgears, comprising:
   an electrical terminal of a switchgear, wherein an electrical contacting surface of the electrical terminal as first current carrying part is configured to be electrically connected with an electrical contacting surface of an external electrical connector part as second current carrying part via a connecting system,
   wherein the connecting system comprises a stretch bolt, which is integrated in the first current carrying part,
   wherein the stretch bolt comprises a male screw thread at the extending end, which is configured to be screwed into a female threaded hole of the second current carrying part via a rotation of the first current carrying part with respect to the second current carrying part such that the electrical contacting surface of the first current carrying part contacts the electrical contacting surface of the second current carrying part.

2. The electrical connection according to claim 1, wherein the stretch bolt and the first current carrying part are realized by one and the same part made from the same raw part.

3. The electrical connection according to claim 1, wherein the stretch bolt is realized as a permanent joint of the stretch bolt with the first current carrying part.

4. The electrical connection according to claim 3, wherein the hole of the second current carrying part is a stud hole.

5. The electrical connection according to claim 3, wherein the concerning current carrying part integrated end of the stretch bolt is integrally bonded to the second current carrying part at the bottom of a stud hole, and that the inner diameter of that stud hole is bigger than the outer diameter of the stretch bolt.

6. The electrical connection according to claim 3, wherein the stretch bolt as well as at least one of the current carrying parts is made of aluminum or copper.

7. The electrical connection according to claim 3, wherein the stretch bolt is made of steel or stainless steel.

8. The electrical connection according to claim 1, wherein at least one of the current carrying parts is at least partly embedded into insulation material.

9. The electrical connection according to claim 8, wherein at least one of the current carrying parts is a terminal of a vacuum interrupter.

10. The electrical connection according to claim 9, wherein the vacuum interrupter is at least partly embedded into insulation material.

11. A method of assembling an electrical connection for medium and high voltage switchgears, the electrical connection comprising: an electrical terminal of a switchgear, an electrical contacting surface of the electrical terminal as first current carrying part being configured to be electrically connected with an electrical contacting surface of an external electrical connector part as second current carrying part via a connecting system, the connecting system comprising a stretch bolt, which is integrated in the first current carrying part, the stretch bolt function comprising a male screw thread at an extending end, which is configured to be screwed into a female threaded hole of the second current carrying part, the method comprising:
   rotating the first current carrying part with respect to the second current carrying part such that the electrical contacting surface of the first current carrying part contacts the electrical contacting surface of the second current carrying part.

12. The method according to claim 11, further comprising rotating the first current carrying part with respect to the second current carrying part until the stretch bolt is sufficiently stretched.

* * * * *